(12) United States Patent
Bouchet et al.

(10) Patent No.: US 9,431,677 B2
(45) Date of Patent: Aug. 30, 2016

(54) BLOCK COPOLYMER INCLUDING A POLYANION BASED ON A TFSILI ANION MONOMER AS A BATTERY ELECTROLYTE

(75) Inventors: Renaud Bouchet, La Tronche (FR); Abdelmaula Aboulaich, Tetouan (MA); Sebastien Maria, Septemes-les-Vallons (FR); Trang Phan, Marseilles (FR); Didier Gigmes, Allauch (FR); Denis Bertin, Marseilles (FR); Rachid Meziane, Lys-les-Lannoy (FR); Jean-Pierre Bonnet, Paris (FR); Michel Armand, Paris (FR)

(73) Assignee: UNIVESITE D'AIX-MARSEILLE, Marseilles (FR)

( * ) Notice: Subject to any disclaimer, the term of this patent is extended or adjusted under 35 U.S.C. 154(b) by 187 days.

(21) Appl. No.: 14/239,905

(22) PCT Filed: Sep. 5, 2012

(86) PCT No.: PCT/FR2012/051982
§ 371 (c)(1),
(2), (4) Date: Jun. 6, 2014

(87) PCT Pub. No.: WO2013/034848
PCT Pub. Date: Mar. 14, 2013

(65) Prior Publication Data
US 2014/0272600 A1  Sep. 18, 2014

(30) Foreign Application Priority Data
Sep. 5, 2011 (FR) .................................. 11 57841

(51) Int. Cl.
| | |
|---|---|
| *C08F 293/00* | (2006.01) |
| *H01M 10/0565* | (2010.01) |
| *C08J 5/22* | (2006.01) |
| *H01M 4/38* | (2006.01) |
| *H01M 4/58* | (2010.01) |
| *H01M 10/052* | (2010.01) |
| *H01M 10/0562* | (2010.01) |

(52) U.S. Cl.
CPC ...... *H01M 10/0565* (2013.01); *C08F 293/005* (2013.01); *C08J 5/2243* (2013.01); *H01M 4/382* (2013.01); *H01M 4/5825* (2013.01); *H01M 10/052* (2013.01); *H01M 10/0562* (2013.01); *C08F 2438/02* (2013.01); *C08J 2353/02* (2013.01); *C08J 2387/00* (2013.01); *H01M 2300/0082* (2013.01); *Y02E 60/122* (2013.01)

(58) Field of Classification Search
CPC ..................... H01M 10/0562; H01M 10/0565; H01M 4/5825; Y02E 60/122; C08J 2353/02; C08J 5/2243; C08J 2387/00; C08F 293/005
See application file for complete search history.

(56) References Cited

U.S. PATENT DOCUMENTS

| | | | | |
|---|---|---|---|---|
| 5,521,025 | A  * | 5/1996 | Chaloner-Gill | 429/314 |
| 6,319,428 | B1 * | 11/2001 | Michot et al. | 252/500 |
| 6,361,901 | B1 * | 3/2002 | Mayes et al. | 429/309 |
| 2006/0204845 | A1 * | 9/2006 | Chang et al. | 429/209 |
| 2007/0048619 | A1 * | 3/2007 | Inda | 429/322 |
| 2009/0280411 | A1 * | 11/2009 | Ohira et al. | 429/221 |
| 2010/0047694 | A1 * | 2/2010 | Chu et al. | 429/232 |
| 2010/0255383 | A1 * | 10/2010 | Kofinas et al. | 429/317 |

FOREIGN PATENT DOCUMENTS

JP     2000-082494    *   3/2000

OTHER PUBLICATIONS

Machine translation of JP 2000-082494, published on Mar. 21, 2000.*
Search Report dated 2012.
"Single-ion polymer electrolytes based on a delocalized polyanion for lithium batteries" Meziane et al. dated Mar. 17, 2011.
"Star-shaped polymer electrolyte with microphase separation structure for all-solid-state lithium batteries" Niitani et al. dated Jan. 1, 2009.

* cited by examiner

Primary Examiner — Anca Eoff
(74) Attorney, Agent, or Firm — Sofer & Haroun, LLP (57) ABSTRACT

The invention relates to a BA diblock or BAB triblock copolymer, in which the A block is a non-substituted polyoxyethylene chain having a mean molecular weight that is no higher than 100 kDa, and the B block is an anionic polymer which can be prepared using one or more monomers selected from among the vinyl monomers and derivatives thereof, said monomers being substituted with a (trifluoromethylsulfonyl)imide (TFSI) anion. The invention also relates to the uses of such a copolymer, in particular for preparing an electrolyte composition for lithium metal polymer (LMP) batteries.

19 Claims, 4 Drawing Sheets

BLOCK COPOLYMER INCLUDING A POLYANION BASED ON A TFSILI ANION MONOMER AS A BATTERY ELECTROLYTE

RELATED APPLICATIONS

This application is a National Phase Application of PCT/FR2012/051982, filed on Sep. 5, 2012, which in turn claims the benefit of priority from French Patent Application No. 11 57841 filed on Sep. 5, 2011, the entirety of which are incorporated herein by reference.

BACKGROUND

1. Field of the Invention

The present invention relates to a block copolymer of the BA or BAB type, where A is a block of the ethylene oxide or derivative type and B is an anionic polymer block based on lithium bis(trifluoromethylsulfonyl)imide, a method of preparation thereof, as well as its uses, notably for preparing an electrolyte composition for lithium-metal-polymer (LMP) batteries.

It applies to the field of the manufacture of lithium-metal-polymer batteries. This type of battery is in the form of an assembly of coiled thin films (coiling of the following unit {electrolyte/cathode/collector/cathode/electrolyte/lithium} on n turns or of n stacked thin films (cut and superposed, or n stacks of the aforementioned unit). This stacked/complexed unit has a thickness of the order of about a hundred micrometers. Four functional sheets are included in its composition: i) a negative electrode (anode) generally consisting of a sheet of metallic lithium or of a lithium alloy, ii) an electrolyte composed of a polymer (generally based on poly(ethylene oxide) (PEO)) and of lithium salts, iii) a positive electrode (cathode) composed of an active electrode material whose working potential is under 4V vs Li$^+$/Li, for example based on metal oxide or based on phosphate of the type LiMPO$_4$ where M represents a metal cation selected from the group Fe, Mn, Co, Ni and Ti, or combinations of these cations, for example LiFePO$_4$, of carbon and of polymer, and finally iv) a current collector generally consisting of a sheet of metal and providing electrical connection.

2. Description of Related Art

The polymers included in the composition of the electrolytes must combine good properties of ionic conductivity and good mechanical properties of elasticity and plasticity to be able to be used satisfactorily in LMP batteries.

Polymer solid electrolytes offer many advantages, namely high thermal stability, improved safety, design of batteries that are thin, flexible and of various shapes, low cost of the material and of its application. Moreover, polymer solid electrolytes allow lithium metal to be used as the anode, offering higher energy densities than lithium ion anodes. Polymer electrolytes are also very interesting owing to their low reactivity with respect to lithium metal and their potential for blocking the growth of dendrites. However, despite these many advantages, the advance of polymer electrolytes has been held back by the inability to develop an electrolyte that has both high ionic conductivity and good mechanical durability. These difficulties arise because high conductivity requires great mobility of the polymer chains, which has the converse effect of producing polymers with low mechanical strength.

Various types of polymers have already been proposed in the literature. In particular, the use of polymers consisting of units of ethylene oxide (EO) has been widely known since the end of the 1970s, but it has been found that they do not have sufficient conductivity at room temperature. For example, poly(ethylene oxide) (PEO) of high molecular weight doped with lithium salt has very good mechanical properties at room temperature but is also a semicrystalline polymer. The crystalline structure restricts the mobility of the chains and reduces the ionic conductivity of the polymer. Above the inciting point of PEO (T$_m$~60-65° C.), ionic conductivity increases considerably, but at these temperatures PEO becomes a viscous liquid and loses its dimensional stability.

Since then, research and development of polymer solid electrolytes possessing improved ionic conductivity as well as good mechanical properties, in particular good flexibility, has continued. Attempts to reinforce the mechanical properties of PEO by adding hard colloidal particles, by increasing the number-average molecular weight of the PEO or by crosslinking, have often caused a decrease in ionic conductivity. Similarly, tests for improving the conductivity of PEO by adding plasticizers have led to deterioration of the mechanical properties.

In order to increase the ionic conductivity of the PEO matrix of polymer solid electrolytes, it has also been envisaged in the literature to copolymerize PEO macromers or produce sequence or block copolymers based on PEO. This latter strategy has been the basis of the main research efforts with considerable development of techniques of controlled radical polymerization such as ATRP (Atom Transfer Radical Polymerization).

The PEO block copolymers used in polymer solid electrolytes can be A-B diblock copolymers or A-B-A triblock copolymers.

For example, diblock copolymers in which the first block is a poly(alkyl methacrylate), notably poly(lauryl methacrylate) (PLMA), poly(n-butyl methacrylate) (PnMBA), or poly(methyl methacrylate) (PMMA), and the second block is poly(polyethylene glycol methacrylate), comprising 9 units of ethylene oxide (PMAPEG), have been proposed, notably by Sadoway D. R. (J. Power Sources, 2004, 129, 1-3). As an example, the copolymer PLMA-b-PMAPEG doped with LiCF$_3$SO$_3$ has a conductivity of the order of 8.10$^{-6}$ S/cm at room temperature, which is insufficient.

More recently, Niitani et al. (Electrochemical Solid-State Letters, 2005, 8(8), 1385-A388; J. Power Resources, 2005, 146, 386-390 and EP 1 553 117), described a triblock polymer composed of PMAPEG (23 units of EO) as central block and polystyrene (PS) as outer blocks. According to this document, the polymer having the best ionic conductivity at 30° C. (2.10$^{-4}$ S/cm) is a copolymer doped with LiClO$_4$ with a ratio EO:Li=20. This ionic conductivity is correct but this corresponds to a viscoelastic liquid and not to a solid. Moreover, the lithium ion transfer number is low, which leads to poor power-handling capability and a large drop in capacity beyond C/10.

The international application WO 00/05774 describes a polymer solid electrolyte including a block copolymer with micro-phase separation comprising an ionic conducting block, a second block not miscible with the ionic conducting block, an anion immobilized on the electrolyte polymer, and a cationic species (Li$^+$) providing neutrality of the polymer and ionic mobility. The use of such a copolymer obviates the need to use an additional lithium salt. In this copolymer, the anion is preferably immobilized on the second block, which induces micro-phase separation of the cations and anions of the electrolyte polymer with the aim of improving the lithium ion transfer number (t$^+$) to a value above 0.5. The ionic conducting block can notably consist of polyethylene oxide (PEO), polyethylene glycol (PEG), polypropylene oxide (PPO) or polypropylene glycol (PPG). The number-average molecular weight of the ionic conducting block is above 50 kg/mol, and especially preferably above 200 000 kg/mol. The second block is not miscible with the first block and can consist of a non-ionic conducting block such as a polyalkyl acrylate of the methacrylate type, a polydimethylsitoxane, a polybutadiene, a polyisoprene, modified polystyrenes with flexible alkylfluorocarbon or siloxane side chains attached to the phenyl groups, etc. The anion is preferably joined to the polymer by a covalent bond and can be selected from carboxylates, sulfonates and phosphates. These polymers can be used in any type of batteries and have operating temperatures varying between 20 and 100° C.

Moreover, polymers comprising a delocalized polyanion attached to the polymer backbone, replacing polymer electrolytes consisting of a simple mixture of a polymer of the PEO type and a salt based on lithium bis(trifluoromethylsulfonyl)imide, in particular with the aim of increasing the transfer number of the $Li^+$ ions, which is only of the order of about 0.2 for this conventional type of electrolyte, have also been proposed, notably by R. Meziane et al. (Electrochimica Acta, 2011, in press, available on-line doi:10.1016/j.electacta.2011.03.074). The polymer is a polystyrene bearing sulfonyl(trifluoromethylsulfonyl)imide groups (PSTFSI (a)), which is obtained by radical polymerization from monomers of the sodium 4-styrene-sulfonyl(trifluoromethylsulfonyl)imide type. This polymer is then used simply mixed with PEO to make an electrolyte membrane that does not contain additional lithium ions. For comparison, membranes prepared with PSTFSI obtained by chemical modification of polystyrene sodium sulfonate (PSTFSI (b)) mixed with PEO, as well as with lithium poly(styrene sulfonate) ($PSSO_3Li$) mixed with PEO have also been tested for their ionic conductivity. The results obtained show equivalent conductivity at 70° C. between the membranes consisting of the mixture PSTFSI (b)/PEO and of the mixture $PSSO_3Li$/PEO whereas that obtained with the membrane PSTFSI (a)/PEO is 10 times higher (of the order of $9.5 \times 10^{-6}$ S $cm^{-1}$). However, the lithium ion transfer number is not stated, Nevertheless, the authors point out that the conductivity of the PSTFSI (a)/PEO membrane is still insufficient relative to the desirable ionic conductivity, which is of the order of $10^{-5}$ S $cm^{-1}$ at room temperature. Moreover, as the two polymers are not joined together covalently, a macro-phase separation leading to a drop in conductivity over time is probable.

OBJECTS AND SUMMARY

There is therefore a need for a compound that can be used as a solid electrolyte for batteries of the LMP type, having ionic conductivity that is further improved relative to that of the polymers available in the prior art, and a high lithium ion transfer number, while also having good mechanical durability.

This aim is achieved by using, as solid electrolyte, the compounds that constitute the object of the invention, and which will be described below.

The present invention relates to a diblock copolymer of the BA type or a triblock copolymer of the BAB type, characterized in that:

block A is an unsubstituted polyoxyethylene chain having a number-average molecular weight less than or equal to 100 kDa;

block B is an anionic polymer that can be prepared from one or more monomers selected from the vinyl monomers and derivatives thereof, said monomers being substituted with a sulfonyl(trifluoromethylsulfonyl)imide (TFSI) anion of the following formula:

in which * represents the point of attachment of said anion of formula (I) to said monomer via a covalent bond or a linear alkyl chain having from 1 to 5 carbon atoms.

In the copolymers according to the invention, the anion of formula (I) is attached to the chain constituting block B, either directly by a covalent bond, or via an alkyl chain. The only mobile ion after dissociation of the copolymer is the $Li^+$ cation, which endows it with specific properties (very good conductivity, transfer number of the $Li^+$ cations ($t^+$) close to 1) while also having good mechanical durability.

According to the invention, block A preferably comprises from 225 to 2,250 ethylene oxide units, and even more preferably from 500 to 1,150 ethylene oxide units. A value that is quite particularly preferred is 795 ethylene oxide units.

The molecular weight of block A is always below 100 kDa and preferably varies from 10 to 50 kDA.

Among the vinyl monomers constituting the block or blocks B, mention may in particular be made of lithium styrene-sulfonyl(trifluoromethylsulfonyl)imide (STFSILi) or (I'-1), lithium sulfonyl(trifluoromethylsulfonyl)imide acrylate (ATFSILi) or (I'-2), lithium sulfonyl(trifluoromethylsulfonyl)imide methacrylate (MMATESILi) or (I'-3), lithium sulfonyl(trifluoromethylsulfonyl)imide acrylamide (I'-4), lithium sulfonyl(trifluoromethylsulfonyl)imide methacrylamide (I'-5), lithium ethylene-sulfonyl(trifluoromethylsulfonyl)imide (I'-6), lithium propylene-sulfonyl(trifluoromethylsulfonyl)imide (I'-7), the lithium sulfonyl (trifluoromethylsulfonyl)imide dienes (I'-8), and lithium maleimide-sulfonyl(trifluoromethylsulfonyl)imide (I'-9). These monomers can be represented by the following formulas (A1) to (A9):

(I'-2)

(I'-3)

(I'-4)

(I'-5)

(I'-6)

(I'-7)

(I'-8)

(I'-9)

Block B can moreover result from the copolymerization of at least one vinyl monomer as defined above and at least one monomer selected from styrene, a poly(ethylene glycol) acrylate (PEGA) and an alkyl acrylate in which the alkyl group comprises from 1 to 16 carbon atoms.

According to a preferred embodiment of the invention, the copolymer is selected from:

i) the triblock copolymers of the type P(STFSILi)-b-PEO-b-P(STFSILi) in which the ratio P(STFSILi)/PEO is in the range from about 10 to 40 wt %;

ii) the triblock copolymers of the type P(MMATFSILi-stat-PEGA)-b-PEO-b-P(MMATFSILi-stat-PEGA) in which blocks B are random copolymers of TFSILi methacrylate and polyethylene glycol acrylate for which the ratio P(MMATFSILi-stat-PEGA)/PEO is in the range from about 10 to 40 wt %.

Copolymers that are particularly preferred according to the present invention are the P(STFSILi)-b-PEO-b-P(STFSILi) copolymers, in which each of the PSTFSILi blocks has a number-average molecular weight in the range from 2000 to 7500 g/mol and the central PEO block has a number-average molecular weight of 35 000 g/mol. A copolymer that is even more particularly preferred according to the present invention is the P(STFSILi)-b-PEO-b-P(STFSILi) copolymer, in which each of the PSTFSILi blocks has a number-average molecular weight of about 4900 g/mol and the central PEO block has a number-average molecular weight of 35 000 g/mol, the PEO block representing 78 wt % of the total weight of the copolymer.

Another copolymer that is particularly preferred according to the present invention is the P(MMATFSILi-stat-PEGA)-b-PEO-b-P(MMATFSILi-stat-PEGA) copolymer in which blocks B are random copolymers of TFSILi methacrylate and polyethylene glycol acrylate in which each of the P(MMATFSILi-stat-PEGA) blocks has a number-average molecular weight of about 7500 g/mol and the central PEO block has a number-average molecular weight of 35 000 g/mol, the PEO block representing 70 wt % of the total weight of the copolymer.

The copolymers according to the invention can be prepared by any method of controlled polymerization (ATRP ("Atom Transfer Radical Polymerization"), RAFT ("Reversible Addition Fragmentation Chain Transfer"), anionic, cationic, NMP ("Nitroxide-Mediated Radical Polymerization")), either directly with a vinyl monomer bearing an anion of the following formula (I'):

(I')

or indirectly with a classical vinyl monomer, then by post-functionalization of the polymer obtained (grafting of the anion of formula (I')).

This polymerization is then followed by a step of ion exchange to replace the $K^+$ cation with an $Li^+$ cation.

As an example, when the synthesis is carried out by the NMP method, it consists of firstly synthesizing a PEO-based macroalkoxyamine and then copolymerizing said macroalkoxyamine and the vinyl monomers bearing an anion of formula (I'), and then performing an ion exchange to replace the $K^+$ cation with an $Li^+$ cation. Synthesis of the PEO-based macroalkoxyamines can be carried out by the method described in the international application WO 2007/113236. Synthesis of the vinyl monomers bearing the anion of formula (I) can for example be carried out by the method described by R. Meziane et al. (ibid.).

More precisely, it consists:

i) in a first step, of copolymerizing monomers bearing the anion of formula (I'), said monomers notably being selected from the monomers of formulas (I'-1) to (I'-9), with a macroalkoxyamine of the following formula (III):

in which:
n=1 or 2
SG1 is a unit of the following formula:

** being the point of attachment of the SG1 units to one of the ends of the PEO unit when n=1 and to each end of the PEO unit when n=2, PEO being a poly(ethylene oxide) chain having a number-average molecular weight below 100 kDa; then ii) in a second step, exchanging the $K^+$ cations with $Li^+$ cations.

Thus, according to this method, reacting a macroalkoxyamine of formula (III) in which n=1 leads to the production of diblock polymers of the BA type and employing a macroalkoxyamine of formula (III) in which n=2 leads to the production of a triblock copolymer of the BAB type as defined above.

The first step is preferably carried out in a polar solvent such as for example N,N-dimethylformamide (DMF), dimethylsulfoxide (DMSO), water at a temperature in the range from 80 to 120° C., for a time of from 2 to 20 hours.

The exchange of cations in step ii) can for example be carried out by means of a dialysis membrane, using a lithium salt, for example lithium chloride.

On completion of step ii), the resultant copolymer according to the invention is then preferably washed to remove excess lithium salt and any excess vinyl monomer that had not polymerized, then the solution is preferably evaporated under vacuum to allow storage of the copolymer.

The tests performed show that the use of the copolymers according to the present invention as polymer solid electrolyte in a lithium metal battery leads to an energy storage device having excellent performance at low temperature (about 60° C.), in particular a lithium ion transfer number above 0.84, and an ionic conductivity of $10^{-5}$ S.cm$^{-1}$ at 60° C. The copolymers according to the present invention, when used as polymer solid electrolyte, also have good mechanical durability, high thermal stability (which ensures safety of the energy storage devices comprising them), and improved stability of potential. The high transfer number makes it possible to limit the development of concentration gradients in the electrolyte during discharge (or during charging) allowing the power performance to be increased (or the charging rate). The use of these copolymers as polymer solid electrolyte in a lithium metal battery also makes it possible to limit dendritic growth of the lithium and thus envisage quick and safe recharging. In fact, the problem with the technology of lithium metal batteries is the formation of heterogeneous electrodeposits of lithium (including dendrites) during recharging, which decreases the cycle life and can lead to short-circuits. Moreover, these polymers are stable up to 4.5 V vs $Li^+/Li$.

Their use as electrolyte in a battery composed of lithium for the anode and LiFePO$_4$ for the cathode leads to a device having very good capacity behavior (retention of more than 90% of the capacity at C/2 regardless of the test temperature, and 80% in a C regime).

Thus, the invention also relates to the use of at least one diblock copolymer of the BA type or triblock copolymer of the BAB type as defined above, as solid electrolyte in a lithium battery, and in particular in a lithium metal battery.

The invention further relates to a polymer solid electrolyte, characterized in that it comprises at least one diblock copolymer of the BA type or triblock copolymer of the BAB type as defined above.

The solid electrolyte polymer according to the invention can further comprise a plasticizer such as a carbonate or a mixture of carbonates selected from propylene carbonate, ethylene carbonate and dimethyl carbonate, succinonitrile, tetraethylsulfonamide, etc.

The solid electrolyte polymer according to the present invention can in particular be in any suitable form, for example in the form of a sheet, a film or a membrane. The solid electrolyte polymer according to the invention can be prepared by any technique known by a person skilled in the art, for example by coating or by extrusion.

Finally, the invention also relates to a cell of a rechargeable lithium battery comprising an anode of metallic lithium and a cathode comprising at least one positive electrode active compound selected from the lithium ion insertion compounds among which there is a polymer solid electrolyte, characterized in that said polymer solid electrolyte is as defined above.

The ideal operating temperature of such a cell is from about 60 to 100° C.

The positive electrode active material is preferably selected from the lithium phosphates, and in particular LiFePO$_4$, Li$_3$V$_2$(PO$_4$)$_3$, LiCoPO$_4$, LiMnPO$_4$, LiNiPO$_4$; the lithium oxides such as for example LiCoO$_2$, and LiMn$_2$O$_4$ and mixtures thereof. Among these compounds, LiFePO$_4$ is quite particularly preferred.

According to a preferred embodiment of the invention, the basis weight of the cathode (i.e. the amount of positive electrode active material/cm$^2$/face) is above 0.6 mAh/cm$^2$, and is preferably in the range from 0.6 to 2.5 mAh/cm$^2$.

Besides the positive electrode active material, the positive electrode can also comprise an agent generating electrical conductivity such as a carbon-containing material, for example carbon black, carbon fibers, carbon nanotubes and mixtures thereof.

The positive electrode can also further comprise at least one copolymer according to the invention as defined above, which makes it possible to prevent the development of a concentration gradient in the thickness of the cathode during cycling and thus improve the power performance of the battery or increase the basis weight of the cathode. In this case, the anionic solid copolymer according to the present invention preferably represents from 25 to 45 wt % relative to the total weight of the cathode.

Also according to a preferred embodiment, the proportions by weight of the positive electrode are as follows: positive electrode active material/polymer solid electrolyte/carbon: 60/37/8.

DETAILED DESCRIPTION

The present invention is illustrated by the following embodiment examples, but is not limited to these.

EXAMPLES

Raw materials used in the examples:
Oxalyl chloride, anhydrous acetonitrile (Alfa-Aeser),
Sodium salt of 4-styrenesulfonic acid, dimethylformamide (DMF), triethylamine, dimethylaminopyridine (DMAP), lithium chloride, dichloromethane, acryloyl chloride, diethyl ether, tetrahydrofuran (THF) (Sigma-Aldrich),
Trifluoromethylsulfonamide (Rhodia)

Nitroxide of the following formula (SG1) (Arkema):

α,ω hydroxylated PEO (Mn=10 000 g/mol and 35 000 g/mol) (Sigma-Aldrich);
MAMA-SG1 of the following formula (Arkema):

Example 1

Synthesis of Block Copolymers of PSTFSILi-b-PEO-b-PSTKSILi

1) Synthesis of Potassium 4-styrenesulfonyl(trifluoromethylsulfonyl)imide (STFSIK)
  1.1) Synthesis of 4-sulfonyl-styrene Chloride
  2 ml of oxalyl chloride (23.3 mmol) and 0.087 g (1 mmol) of dimethylformamide (DMF) were added to 40 mL of anhydrous acetonitrile. The reaction mixture was stirred for 5 hours to promote the formation of a Vilsmeier-Haack complex (complex between DMF and oxalyl chloride (CH$_3$)$_2$N$^+$=CClH). Once the solution has turned yellow, 4 g of sodium salt of styrenesulfonic acid was slowly added to the reaction mixture, under nitrogen atmosphere and at room temperature. The reaction mixture was then stirred for 24 hours at room temperature. The precipitate of NaCl formed was removed by filtration. 42 mL of solution of 4-sulfonyl-styrene chloride was obtained.

$^1$H NMR (300 MHz; DMSO-d6; 298 K): δ ppm 7.59 (d, 2H); 7.44 (d, 2H); 6.72 (q, 1H); 5.84 (d, 1H); 5.27 (d, 1H); 5.27 (d, 1H).

$^{13}$C NMR (75 MHz; DMSO-d6; 298 K): δ ppm 146.91; 137.66; 136.16; 125.93; 125.72; 115.18.

1.2) Synthesis of Potassium 4-styrenesulfonyl(trifluoromethylsulfonyl)imide (STFSIK)
  8.1 mL of triethylamine (28.2 mmol), 2.89 g of trifluoromethylsulfonamide (19.4 mmol) and a catalytic amount of DMAP (about 215 mg) were added successively to 30 mL of anhydrous acetonitrile. The reaction mixture was stirred for 1 hour. The solution of 4-sulfonyl-styrene chloride obtained above in step 1.1) was cooled to 0° C., and then the reaction mixture containing trifluoromethylsulfonamide was slowly added to it. The resultant mixture underwent vigorous magnetic stirring for 16 hours. After evaporation of the solvent, a brown solid was recovered, which was then dissolved in 50 mL of dichloromethane. This solution was washed twice with 20 mL of aqueous NaHCO$_3$ solution at 4% and then with 20 mL of 1M hydrochloric acid. Potassium 4-styrenesulfonyl(trifluoromethylsulfonyl)imide was obtained by neutralizing the acid monomer using excess of K$_2$CO$_3$ in water. The resultant suspension was stirred for 1 hour, filtered and dried to give 4.2 g of the expected product in the form of a light yellow solid. Recrystallization of this in water gave 3.63 g of powder (yield 53%).

$^1$H NMR (300 MHz; DMSO-d6; 298 K): δ ppm 7.73 (d, 2H); 7.57 (d, 2H); 6.79 (q, 1H); 5.95 (d, 1H); 5.38 (d, 1H).

$^{13}$C NMR (75 MHz; DMSO-d6; 298 K): δ ppm 144.21; 139.55; 135.57; 126.43; 125.87; 126.36.

2) Synthesis of the Macroalkoxyamine PEO-diSG1

The macroalkoxyamine SG1-MAMA-PEO-MAMA-SG1 (or PEO-diSG1) of the following formula was synthesized:

in which SG1 is as defined above and the value of n is such that Mn=35 kg/mol.

10 g of α,ω hydroxylated PEO (Mn=10 000 g/mol), and 1.4 mL of triethylamine were dissolved in a three-necked flask containing 40 mL of dichloromethane. The reaction mixture was degassed by bubbling with nitrogen for 20 minutes. Using a dropping funnel, 0.9 mL of acryloyl chloride dissolved (5 eq.) in 10 mL of dichloromethane was then added dropwise at a temperature of 90° C. It was left to react for about 15 hours. The reaction mixture was filtered to remove the triethylammonium chloride. The filtrate was washed twice with 20 mL of a saturated aqueous solution of NaHCO$_3$. The organic phase was precipitated in diethyl ether. PEO diacrylate was recovered by filtration and then dried under vacuum. Next, 2 g of PEO diacrylate was introduced into a "Schlenk" equipped with a "Rotaflo". 0.16 g (4.2 mmol) of MAMA-SG1 of the formula stated above, dissolved in 6 mL of THF, was added to the PEO diacrylate. The suspension was deoxygenated by bubbling with nitrogen for 30 minutes. The "Schlenk" was immersed in an oil bath with thermostat set at 100° C. for 1 hour. The THF was evaporated under vacuum at room temperature.

The expected PEO-diSG1 was obtained.

3) Synthesis of a PSTFSILi-b-PEO-b-PSTFSILi Block Copolymer at 30.8 wt % of PSTFSILi 0.84 g of PEO-diSG1 macroalkoxyamine obtained above in the preceding step (2.34×10$^{-5}$ mol), 0.6 g of STFSIK (1.7×10$^{-3}$ mol) obtained above in step 1), 1.15×10$^{-3}$ g of nitroxide of formula SG1 (purity at 85 wt %, hence 3.3×10$^{-6}$ mol), and 3.5 mL of DMF were put in a three-necked flask equipped with a condenser, a bubbler and a magnetized bar. The mixture was degassed for 20 min by bubbling with argon in order to remove the oxygen from the reaction mixture. The mixture was then heated at 110° C. for 4 h. The polymerization reaction was stopped by immersing the flask in an ice bath. The solvent (DMF) was then evaporated under vacuum and the residue obtained was dissolved in 30 mL of deionized water. The solution obtained was then put on a dialysis membrane sold under the trade name Cellu-Sep® T2 by the company Orange Scientific, having a cut-off (MWCO) of 6000-8000 Da and was dialyzed with 4 times 1 liter of lithium chloride solution (0.25 mol/L), in order to perform exchange of K$^+$ cations with Li$^+$ cations (0.25 mol/L), then with 4 times 1 liter of deionized water to remove excess lithium chloride. The dialysis step also made it possible to remove the monomer and the remaining DMF. The solution of copolymer was then evaporated under vacuum.

The expected block copolymer was obtained, in which each of the PSTFSILi blocks had a number-average molecular weight of 7300 g/mol (estimate based on 30.8 wt % measured by NMR) and the central PEO block had a number-average molecular weight of 35 000 g/mol, the PSTFSILi block representing 30.8 wt % of the total weight of the copolymer.

Copolymers that were identical but in which the PSTFSILi block represented respectively 9.5, 21.4 or 42.9 wt % of the total weight of the copolymer were also prepared in this example:

Synthesis of a PSTFSILi-b-PEO-b-PSTKSILi Block Copolymer at 9.5 wt % of PSTFSILi 0.72 g of PEO-diSG1 macroalkoxyamine obtained above in the preceding step (2.02×10$^{-5}$ mol), 0.15 g of STFSIK (4.26×10$^{-4}$ mol) obtained above in step 1), 9.89×10$^{-4}$ g of nitroxide of formula SG1 (purity at 85 wt %, hence 2.9×10$^{-6}$ mol), and 2.2 mL of DMF were put in a three-necked flask equipped with a condenser, a bubbler and a magnetized bar. The mixture was degassed for 20 min by bubbling with argon in order to remove the oxygen from the reaction mixture. The mixture was then heated at 110° C. for 2 h 50 min. Purification was carried out in the same way as for the copolymer at 30%.

The expected block copolymer was obtained, in which each of the PSTFSILi blocks had a number-average molecular weight of 1800 g/mol (estimate based on 9.5 wt % measured by NMR) and the central PEO block had a number-average molecular weight of 35 000 g/mol, the PSTFSILi block representing 9.5 wt % of the total weight of the copolymer.

Synthesis of a PSTFSILi-b-PEO-b-PSTKSILi Block Copolymer at 21.4 wt % of PSTFSILi 0.96 g of PEO-diSG1 macroalkoxyamine obtained above in the preceding step (2.67×10$^{-5}$ mol), 0.4 g of STFSIK (1.13×10$^{-3}$ mol) obtained above in step 1), 1.31×10$^{-3}$ g of nitroxide of formula SG1 (purity at 85 wt %, hence 3.8×10$^{-6}$ mol), and 3.3 mL of DMF were put in a three-necked flask equipped with a condenser, a bubbler and a magnetized bar. The mixture was degassed for 20 min by bubbling with argon in order to remove the oxygen from the reaction mixture. The mixture was then heated at 110° C. for 3 h 10 min. Purification was carried out in the same way as for the copolymer at 30.8%.

The expected block copolymer was obtained, in which each of the PSTFSILi blocks had a number-average molecular weight of 4800 g/mol (estimate based on 21.4 wt % measured by NMR) and the central PEO block had a number-average molecular weight of 35 000 g/mol, the PSTFSILi block representing 21.4 wt % of the total weight of the copolymer.

Synthesis of a PSTFSILi-b-PEO-b-PSTKSILi Block Copolymer at 42.9 wt % of PSTFSILi 0.72 g of PEO-diSG1 macroalkoxyamine obtained above in the preceding step (2.02×10$^{-5}$ mol), 0.8 g of STFSIK (2.26×10$^{-3}$ mol) obtained above in step 1), 9.85×10$^{-3}$ g of nitroxide of formula SG1 (purity at 85 wt %, hence 2.8×10$^{-6}$ mol), and 4.7 mL of DMF were put in a three-necked flask equipped with a condenser, a bubbler and a magnetized bar. The mixture was degassed for 20 min by bubbling with argon in order to remove the oxygen from the reaction mixture. The mixture was then heated at 110° C. for 4 h 20 mm. Purification was carried out in the same way as for the copolymer at 30.8%.

The expected block copolymer was obtained, in which each of the PSTFSILi blocks had a number-average molecular weight of 13 100 g/mol (estimate based on 42.9 wt % measured by NMR) and the central PEO block had a number-average molecular weight of 35 000 g/mol, the PSTFSILi block representing 42.9 wt % of the total weight of the copolymer.

Example 2

Synthesis of a P(MMATFSILi-stat-PEGA)-b-PEO-b-P(MMATFSILi-stat-PEGA) Block Copolymer 1) Synthesis of Potassium 3-sulfonyl(trifluoromethylsulfonyl)imide Propyl Methacrylate (MMATFSIK)

This product was synthesized according to the same protocol as potassium 4-styrenesulfonyl(trifluoromethylsulfonyl)imide (STFSIK) using the potassium salt of 3-sulfopropyl methacrylic acid instead of the sodium salt of styrenesulfonic acid. 2.0 mL of oxalyl chloride, 0.087 g of DMF, 40 mL of anhydrous acetonitrile and 5.0 g of the potassium salt of 3-sulfopropyl methacrylic acid were used first; then: 8.1 mL of triethylamine, 2.89 g of trifluoromethylsulfonamide, a catalytic amount of DMAP (about 215 mg) and 30 mL of anhydrous acetonitrile.

$^1$H NMR (300MHz; DMSO-d6; 298 K): δ ppm 6.04 (s, 1H); 5.67 (m, 1H); 4.17 (t, 2H); 3.06 (m, 2H); 2.01 (m, 2H); 1.88 (s, 3H);

$^{13}$C NMR (75 MHz; DMSO-d6; 298 K): δ ppm 166.4 (C=O); 135.7 (C=C); 125.7 ($CH_2$=C); 120.0 ($CF_3$ q); 63.6; 51.2; 23.4; 17.9.

2) Synthesis of the P(MMATFSILi-stat-PEGA)-b-PEO-b-P(MMATFSILi-stat-PEGA) Block Copolymer at 9 wt % of P(MMATFSILi-stat-PEGA)

1.05 g of PEO-diSG1 macroalkoxyamine obtained above in step 2) of example 1 ($3.0 \times 10^{-5}$ mol), 0.124 g of MMATF-SIK ($1.13 \times 10^{-3}$ mol) obtained above in step 1), $8.7 \times 10^{-4}$ g of nitroxide of formula SG1 (purity at 85 wt %, hence $3.3 \times 10^{-6}$ mol), and 4.8 mL of deionized water were put in a Schlenk tube equipped with a magnetized bar. The mixture was degassed by 3 successive cycles of freezing in liquid nitrogen/degassing under vacuum/thawing/putting under argon atmosphere, in order to remove the oxygen from the reaction mixture. The mixture was then heated at 110° C. for 4 h. The polymerization reaction was stopped by immersing the flask in an ice bath. The reaction mixture obtained was diluted in 30 mL of deionized water and put on a dialysis membrane sold under the trade name Cellu-Sep® T2 by the company Orange Scientific, having a cut-off (MWCO) of 6000-8000 Da and dialyzed with 4 times 1 liter of lithium chloride solution (0.25 mol/L), in order to perform exchange of $K^+$ cations with $Li^+$ cations (0.25 mol/L), then with 4 times 1 liter of deionized water to remove excess lithium chloride. The dialysis step also made it possible to remove the remaining monomer. The solution of copolymer was then evaporated under vacuum.

The expected block copolymer was obtained, in which each of the P(MMATFSILi-stat-PEGA) blocks had a number-average molecular weight of 1700 g/mol (estimate based on 9 wt % measured by NMR) and the central PEO block had a number-average molecular weight of 35 000 g/mol, the P(MMASTFSFLi-stat-PEGA) block representing 9 wt % of the total weight of the copolymer (7% of MMATFSILi and 2% of PEGA).

P(MMATFSILi-stat-PEGA)-b-PEO-b-P(MMATFSILi-stat-PEGA) polymers at 20 and 30 wt % of P(MMASTF-SILi-stat-PEGA) respectively were also prepared by the same method using different proportions of raw material.

Example 3

Investigation of the Physical and Chemical Properties of the PSTFSILi-b-PEO-b-PSTKSILi Block Copolymers Prepared in Example 1

1) Thermodynamic Properties

The melting of the PEO crystallites in the various copolymers prepared above in example 1 was studied by differential thermal analysis (DSC: Differential Scanning Calorimetry) using apparatus sold under the reference DSC 2920 by the company Thermal Analysis using an aluminum boat, in the temperature range −70° C. to 80° C. with a heating rate of 5° C./min (nitrogen flow rate: 10 mL/min).

Figure 1:
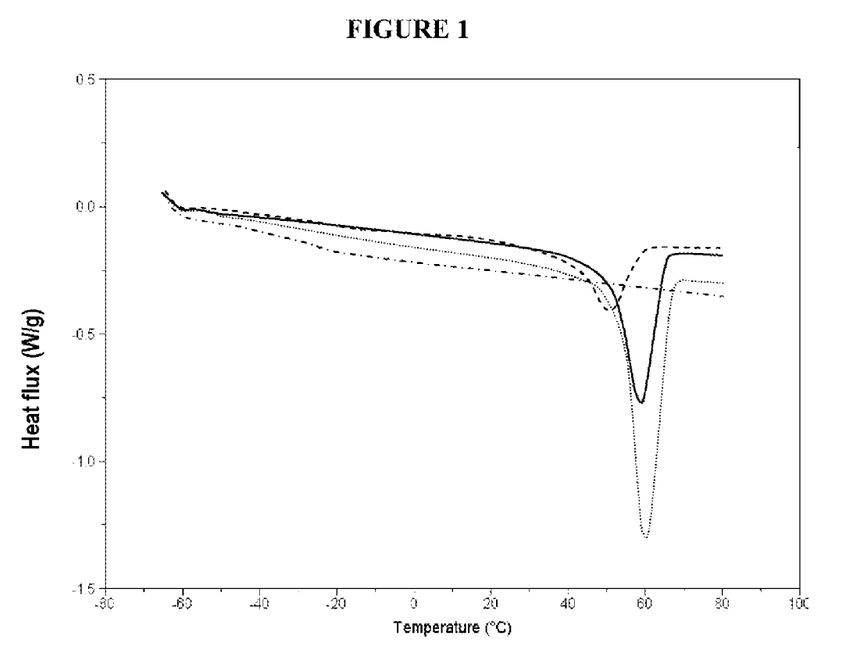
FIG. 1 is a thermograms obtained according to example 3, in accordance with one embodiment.

The thermograms obtained are presented in the appended FIG. 1, where the heat flux (in W/g) is a function of the temperature. In this figure, the dotted curve corresponds to the copolymer at 9.5 wt % of PSTFSILi, the solid curve corresponds to the copolymer at 21.2 wt % of PSTFSILi, the curve with spaced dashes corresponds to the copolymer at 30.8 wt % of PSTFSILi and the dot-and-dash curve corresponds to the copolymer at 42.9 wt % of PSTFSILi.

The data are presented in Table 1 below:

TABLE 1

| wt % of P(STFSILi) | $T_m$ (° C.) | ΔHf Triblock (J/g) | ΔHf PEO (J/g) | Degree of crystallinity % | Tg (° C.) |
|---|---|---|---|---|---|
| 0 | 63.9 | / | 179 | 83 | −60 |
| 9.5 | 54.3 | 115.4 | 127.5 | 59.7 | — |
| 21.4 | 51.3 | 79.4 | 100.1 | 47.3 | — |
| 30.8 | 40.5 | 48.2 | 69.6 | 32.6 | −25.1 |
| 42.9 | — | — | — | — | −25.8 |

In this table, $T_m$ is the melting point, ΔHf triblock is the enthalpy of fusion of the triblock copolymer, ΔHf PEO is the enthalpy of fusion of the PEO block only, and Tg is the glass transition temperature of the PEO.

It is found that there is a large decrease both in the melting point and the enthalpy of fusion (endothermic peak) of the PEO crystallites when the proportion of P(STFSILi) increases in such a way that the sample at 42.9 wt % of PEO no longer has any trace of fusion. There is also found to be a large increase in the glass transition temperature of PEO, characteristic of reduced segment mobility, which can be linked to strong interaction of the ether groups of PEO with the TFSILi groups of the polyanionic block similar to that of homo-PEO directly complexed with a TFSILi salt. Such complexation is very favorable to dissociation of the TFSILi polar head and formation of a (fixed) anion/(mobile) cation pair.

2) Ionic Conductivity

Figure 2:
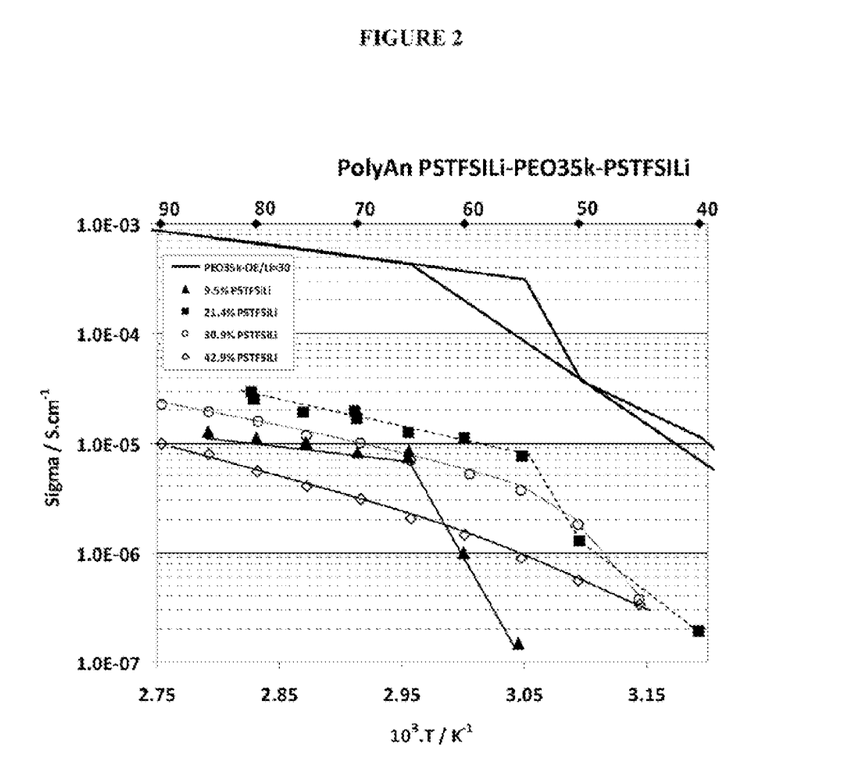
FIG. 2 is a graph of the ionic conductivity of the copolymers prepared in example 1 with the variations shown as per example 3, in accordance with one embodiment.

Characterization of the ionic conductivity of the copolymers prepared in example 1 above was carried out by impedance spectroscopy on a frequency analyzer 1260 sold by the company Solartron. The results Obtained are shown in the appended FIG. 2, in which the variations obtained as a function of the temperature are given in Arrhenius coordinates. These figures also show the values obtained with a PEO homopolymer with number-average molecular weight equal to 35 kg/mol, doped with a lithium salt (LiTFSI) in an amount such that the ratio EO/Li was 30 (black solid curve). The conductivity maximum is observed for 78 wt % of PEO relative to the total weight of the copolymer, i.e. for a ratio EO/Li of approximately 30. The latter reaches $10^{-5}$ S·cm$^{-1}$ at 60° C., which is without precedent at such an operating temperature for solvent-free polymer electrolytes with fixed anions. The transfer number of these materials was measured by impedance using a frequency analyzer 1260 sold by the company Solartron; it reaches values above 0.84.

3) Stability of Potential

The electrochemical stability of these copolymers was studied by cyclic voltammetry using cells consisting of an anode of lithium metal, a copolymer as prepared in example 1 as solid electrolyte and a sheet of platinum as cathode. The measurements were carried out at 80° C. between 1.5 and 5.5 V (vs Li$^+$/Li) at a scanning rate of 1 mVs$^{-1}$.

Figure 3:
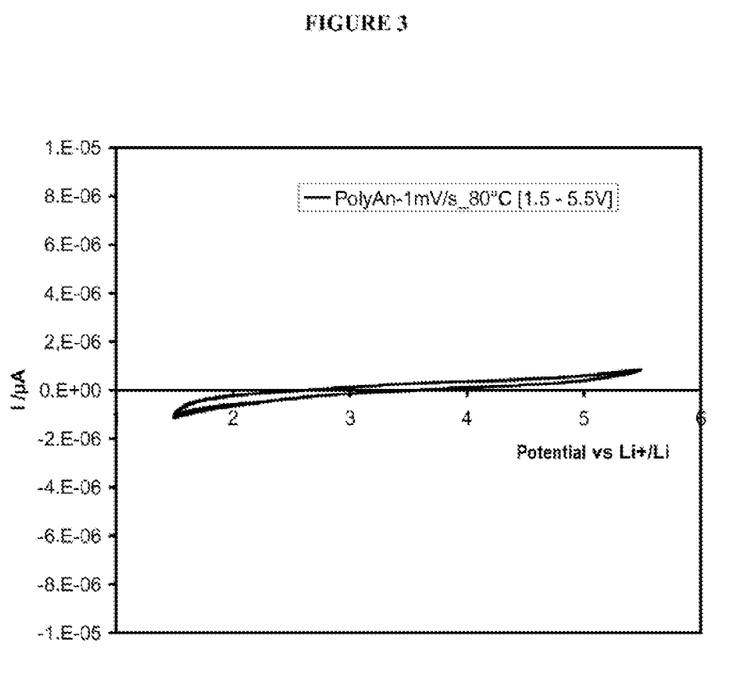
FIG. 3 is a graph of the intensity (in μA) is a function of the potential (in V vs Li+/Li) for a copolymer as prepared in example 1, in accordance with one embodiment.

The results obtained are given in the appended FIG. 3, in which the intensity (in μA) is a function of the potential (in V vs Li+/Li).

These results show that these copolymers are stable up to 4.5 V vs Li+/Li, which is greater than that of the PEO homopolymer doped with the corresponding lithium salt (3.8 V vs Li+/Li). This result is consistent with the fact that the instability at high potential is due to the anions which, in the case of the copolymers according to the invention, are fixed on the polymer backbone, which reinforces their electrochemical stability. This means it is possible to envisage the use of cathode materials at relatively high potential (between 4 and 4.3 V vs Li$^+$/Li) such as $LiCoO_2$, $LiMn_2O_4$, $Li_3V_2(PO_4)_3$ etc.

Example 4

Preparation of Lithium Batteries Incorporating the PSTFSILi-b-PEO-b-PSTKSILi Copolymers Prepared in Example 1 as Polymer Solid Electrolyte Prototypes of batteries based on the copolymer according to the present invention, at 30.8 wt % of P(STFSILi) as prepared above in example 1, were assembled using metallic lithium as anode and LiFePO$_4$ for the cathode as model cathode material. The thickness of the layer of solid electrolyte was about 70 μm. A non-optimized composite cathode formulation at 60 wt % of LiFePO$_4$, 32 wt % of copolymer according to the invention and 8 wt % of carbon black was produced by coating. The measured areal capacity was of the order of 0.75 mAh·cm$^{-2}$, which is comparable to the standard Li-ion technologies.

Figure 4:
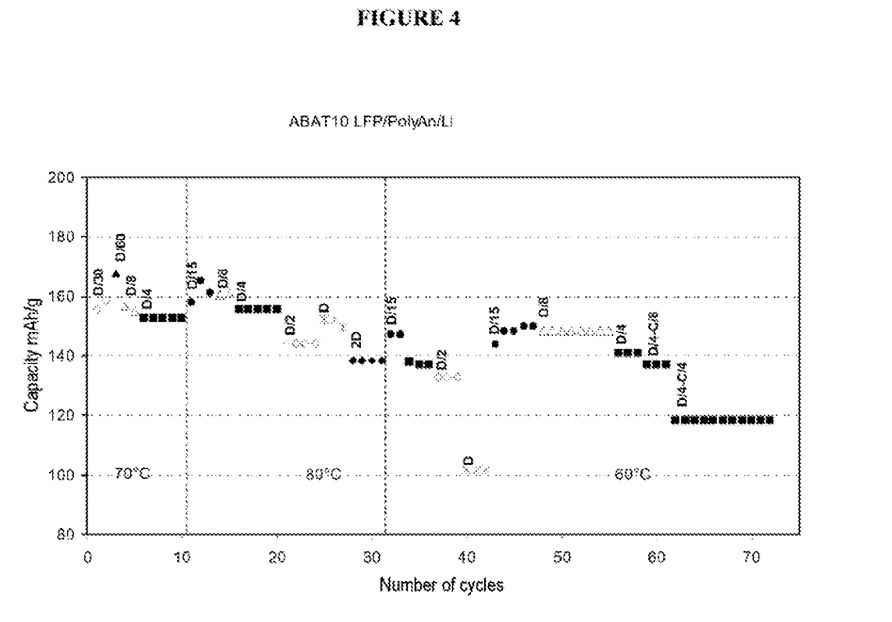
FIG. 4 is a graph of discharge capacity (in mAh/g) as a function of the number of cycles of a battery prepared according to example 4, in accordance with one embodiment.

Cycling tests were conducted at different temperatures (60° C., 70° C. and 80° C.) and different discharge regimes from D/60 to 2D; the charge is generally C/15 except in the last cycles C/8 and C/4. The appended FIG. 4 shows the discharge capacity (in mAh/g) as a function of the number of cycles of the battery tested. The different regimes are indicated on the figure along with the test temperatures.

The results are very interesting, in that the battery thus prepared has a comparable cycle life at 60, 70 and 80° C., which is an achievement compared to the results in the literature on dry polymers. All the more so since it is the same battery prototype that operated in the different thermal conditions, which is a harsh treatment as the tests are usually carried out in isothermal conditions, except in cases of simulation of accelerated aging.

Figure 5:
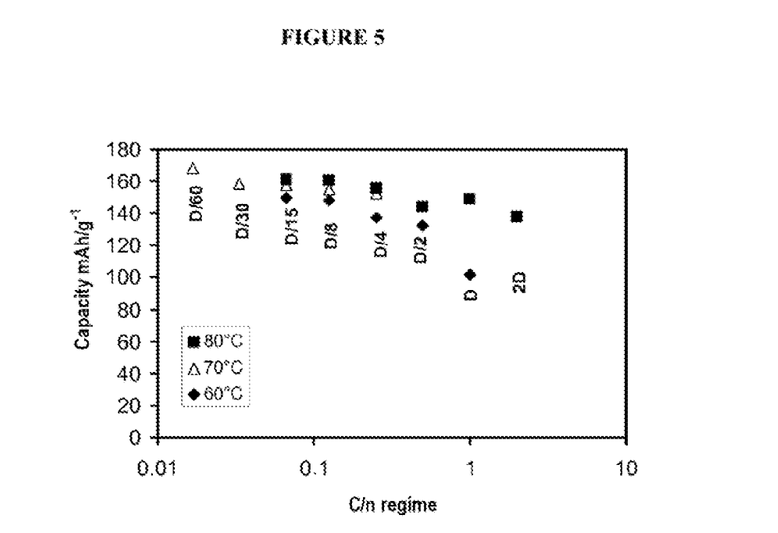
FIG. 5 is a graph of the power-handling capability of the battery of example 4, in accordance with one embodiment.

The power-handling capability of the battery is given in the appended FIG. 5, where the discharge capacity (in mAh/g) is a function of the logarithm of the current density (pseudo Ragone curve). In this figure, the curve whose points are filled squares corresponds to operation at 80° C., the curve whose points are empty triangles corresponds to operation at 70° C., and the curve whose points are filled diamonds corresponds to operation at 60° C.

Notably it is found that there is retention of more than 80% of the capacity at C/2 regardless of the test temperature and restitution of 80% of the capacity at 80° C. at 2D. There does not exist a priori any dry polymer technology offering such performance in the prior art. Without wishing to be bound by a theory, the inventors think that these results are connected with the fact that the electrolyte located between the two electrodes, but also in the composite cathode, has a cation transfer number approaching 1 while having correct conductivity (with little penalty in terms of polarization). This can prevent the development of concentration gradients (in the electrolyte and the electrode) during cycling, which usually limits the power of the batteries quite considerably.

The invention claimed is:

1. A diblock copolymer of the BA type or a triblock copolymer of the BAB type, wherein:
   block A is an unsubstituted polyoxyethylene chain having a number-average molecular weight less than or equal to 100 kDa;
   block B is an anionic polymer that can be prepared from one or more monomers selected from the vinyl monomers and derivatives thereof, said monomers being substituted with an anion (trifluoromethylsulfonyl)imide (TFSI) of the following formula:

(I)

in which * represents the point of attachment of said anion of formula (I) to said monomer via a covalent bond or a linear alkyl chain having from 1 to 5 carbon atoms.

2. The copolymer as claimed in claim 1, wherein block A comprises from 225 to 2250 ethylene oxide units.

3. The copolymer as claimed in claim 1, wherein the molecular weight of block A is in the range from 10 to 50 kDA.

4. The copolymer as claimed in claim 1, wherein the vinyl monomers constituting block or blocks B are selected from the group consisting of lithium styrene-sulfonyl(trifluoromethylsulfonyl)imide, lithium sulfonyl(trifluoromethylsulfonyl)imide acrylate, lithium sulfonyl(trifluoromethylsulfonyl)imide methacrylate, lithium sulfonyl (trifluoromethylsulfonyl)imide acrylamide, lithium sulfonyl (trifluoromethylsulfonyl)imide methacrylamide, lithium ethylene-sulfonyl(trifluoromethylsulfonyl)imide, lithium propylene-sulfonyl(trifluoromethylsulfonyl)imide, the lithium sulfonyl(trifluoromethylsulfonyl)imide dienes, and lithium maleimide-sulfonyl(trifluoromethylsulfonyl)imide.

5. The copolymer as claimed in claim 4, wherein block B results from the copolymerization of at least one vinyl monomer and of at least one monomer selected from styrene, a poly(ethylene glycol) acrylate and an alkyl acrylate in which the alkyl group comprises from 1 to 16 carbon atoms.

6. The copolymer as claimed in claim 1, wherein said copolymer is selected from:
   i) the triblock copolymers of the type P(STFSILi)-b-PEO-b-P(STFSILi) in which the ratio P(STFSILi)/PEO is in the range from 10 to 40 wt %;

ii) the triblock copolymers of the type P(MMATFSILi-stat-PEGA)-b-PEO-b-P(MMATFSILi-stat-PEGA) in which blocks B are random copolymers of TFSILi methacrylate and of polyethylene glycol acrylate in which the ratio P(MMATFSILi-stat-PEGA)/PEO is in the range from 10 to 40 wt %.

7. The copolymer as claimed in claim 1, wherein said copolymer is selected from the P(STFSILi)-b-PEO-b-P(STFSILi) copolymers, in which each of the PSTFSILi blocks has a number-average molecular weight in the range from 2,000 to 7500 g/mol and the central PEO block has a number-average molecular weight of 35 000 g/mol.

8. The copolymer as claimed in claim 1, wherein said copolymer is the copolymer P(STFSILi)-b-PEO-b-P(STFSILi), in which each of the PSTFSILi blocks has a number-average molecular weight of about 4900 g/mol and the central PEO block has a number-average molecular weight of 35 000 g/mol, the PEO block representing 78 wt % of the total weight of the copolymer.

9. The copolymer as claimed in claim 1, wherein said copolymer is the copolymer P(MMASTFSILi-stat-PEGA)-b-PEO-b-P(MMATFSILi-stat-PEGA), in which blocks B are random copolymers of TFSILi methacrylate and of polyethylene glycol acrylate in which each of the P(MMATFSILi-stat-PEGA) blocks has a number-average molecular weight of 7500 g/mol and the central PEO block has a number-average molecular weight of 35 000 g/mol, the PEO block representing 70 wt % of the total weight of the copolymer.

10. A solid electrolyte in a lithium battery, wherein said solid electrolyte comprisies:
at least diblock copolymer of the BA type or triblock copolymer of the BAB type as defined in claim 1.

11. A polymer solid electrolyte, wherein said polymer solid electrolyte comprises at least one diblock copolymer of the BA type or triblock copolymer of the BAB type as defined in claim 1.

12. The polymer electrolyte as claimed in claim 11, wherein said polymer electrolyte further comprises a plasticizer selected from either one of a carbonate or a mixture of carbonates selected from the group consisting of propylene carbonate, ethylene carbonate and dimethyl carbonate, succinonitrile, tetraethylsulfonamide.

13. A cell of a rechargeable lithium battery comprising an anode of metallic lithium and a cathode comprising at least one positive electrode active compound selected from the lithium ion insertion compounds between which there is a polymer solid electrolyte, wherein said polymer solid electrolyte is an electrolyte as claimed in claim 11.

14. The cell as claimed in claim 13, wherein an operating temperature of said cell is from 60 to 100° C.

15. The cell as claimed in claim 13, wherein the positive electrode active material is $LiFePO_4$.

16. The cell as claimed in claim 13, wherein the amount of positive electrode active material/$cm^2$/face is above 0.6 $mAh/cm^2$.

17. The cell as claimed in claim 13, wherein the positive electrode further comprises an agent generating electrical conductivity.

18. The cell as claimed in claim 13, wherein the positive electrode further comprises at least one copolymer as defined in claim 1.

19. The cell as claimed in claim 18, wherein the proportions by weight of the positive electrode are as follows: positive electrode active material/polymer solid electrolyte/carbon: 60/32/8.

* * * * *